UNITED STATES PATENT OFFICE.

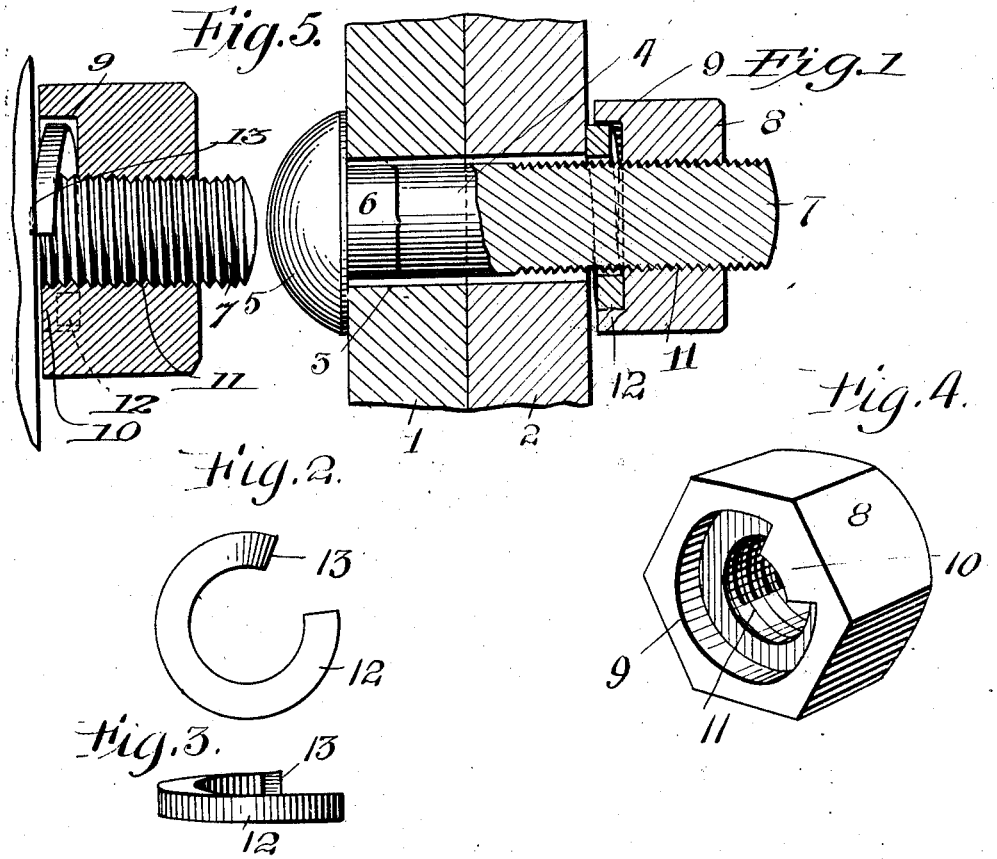

FREDRICK P. HUNKLE, OF McKEESPORT, PENNSYLVANIA.

NUT-LOCK.

1,058,750.  Specification of Letters Patent.  Patented Apr. 15, 1913.

Application filed May 21, 1912. Serial No. 698,780.

*To all whom it may concern:*

Be it known that I, FREDRICK P. HUNKLE, a citizen of the United States of America, residing at McKeesport, in the county of Allegheny and State of Pennsylvania, have invented certain new and useful Improvements in Nut-Locks, of which the following is a specification, reference being had therein to the accompanying drawing.

This invention relates to a nut locking device, and the primary object of my invention is the provision of positive and reliable means, in connection with a nut, whereby the nut can be firmly locked upon a bolt, and prevented from becoming accidentally displaced.

Another object of this invention is to provide a nut locking device that can be used in connection with the present type of bolt, the device being of such construction that it can be manufactured at a comparatively small cost and easily and quickly installed.

A further object of this invention is to accomplish the above results by a mechanical construction that will be hereinafter specifically described and then claimed, and reference will now be had to the drawing, wherein:—

Figure 1 is a longitudinal sectional view of the nut locking device, Fig. 2 is an elevation of a detached locking device. Fig. 3 is a plan of the same, Fig. 4 is a perspective view of a detached nut in accordance with this invention, and Fig. 5 is a perspective view of the nut, broken away, illustrating the threaded projection on the inner face of the nut.

The reference numerals 1 and 2 denote, by the way of an example, two pieces of material having a registering opening 3 and extending through said openings is a bolt 4 that has a head 5 and an oval portion 6 engaging the opening of the piece of material 1 to prevent the bolt from rotating. The threaded end 7 of the bolt protrudes from the opening 3 of the piece of material 2 and screwed upon said bolt is a nut 8. The inner face of the nut 8 has a recess 9 that is substantially C-shaped, the wall of said recess having an inwardly projecting segment-shaped portion 10 that carries a continuation of the threads 11 of the nut.

The reference numeral 12 denotes a nut locking device in the form of a resilient split washer. The washer 12 has the ends 13 thereof bent out of alinement and the ends of the washer are sufficiently separated to provide clearance for the inwardly projecting portion 10 of the nut 8. When the nut 8 is screwed upon the bolt 4, the washer 12 is bound between the nut and the piece of material 2, and the resiliency of the washer is such that it is placed under tension and exerts a pressure against the nut, which binds the threads thereof against the threads of the bolt. As the nut 8 is rotated, the washer 12 is carried with said nut by reason of the inwardly projecting portion 10 engaging one of the ends of the washer.

It is thought that the operation and utility of the nut locking device will be apparent without further description, and while in the drawing there are illustrated the preferred embodiments of the invention, I would have it understood that the structural elements are susceptible to such changes as fall within the scope of the appended claim.

What I claim is:—

In a nut locking device comprising a threaded bolt, a nut screwed upon said bolt and having its inner face provided with a C-shaped recess opening into the bore of the nut and further providing the inner face of the nut with a projection, said projection having one face threaded and forming a continuation of the threads of the bore of the nut, the other faces of said projection constituting the end walls of the recess and providing shoulders, and a resilient split washer arranged within said recess and having the ends thereof spaced by said projection and adapted to be placed under pressure when the nut is screwed home whereby said washer will exert a pressure upon the nut and cause the threads of the projection and the threads of the nut to bind against the threads of the bolt thereby maintaining the nut in position.

In testimony whereof I affix my signature in the presence of two witnesses.

FREDRICK P. HUNKLE.

Witnesses:
  MAX H. SROLOVITZ,
  K. H. BUTLER.